(12) United States Patent
Wa Fai

(10) Patent No.: US 7,100,766 B2
(45) Date of Patent: Sep. 5, 2006

(54) COMPACT DISC/PHOTO HOLDER

(75) Inventor: John Ng Wa Fai, Markham (CA)

(73) Assignee: Northvale Industries Co., Ltd., (CA)

( * ) Notice: Subject to any disclaimer, the term of this patent is extended or adjusted under 35 U.S.C. 154(b) by 352 days.

(21) Appl. No.: 10/791,234

(22) Filed: Mar. 2, 2004

(65) Prior Publication Data

US 2005/0194271 A1    Sep. 8, 2005

(51) Int. Cl.
*B65D 85/57*    (2006.01)
(52) U.S. Cl. ............... 206/312; 206/232; 206/308.1; 206/313; 383/39; 229/72
(58) Field of Classification Search ........... 206/232, 206/308.1, 307.1, 312, 313, 309; 383/38–40, 383/66, 105, 107, 127; 229/72, 67.1
See application file for complete search history.

(56) References Cited

U.S. PATENT DOCUMENTS

| | | | | |
|---|---|---|---|---|
| 3,876,134 A | * | 4/1975 | Rice et al. ............... | 206/312 |
| 5,588,527 A | * | 12/1996 | Youngs ................ | 206/308.1 |
| 5,588,528 A | * | 12/1996 | Ozeki ................. | 206/308.1 |
| 5,690,220 A | * | 11/1997 | Swan ................. | 206/308.1 |
| 5,845,772 A | * | 12/1998 | Cieplak ............... | 206/308.3 |
| 5,882,748 A | * | 3/1999 | Tomoda ............... | 428/35.2 |
| 5,938,019 A | * | 8/1999 | Weingarden ........... | 206/308.1 |
| 6,837,368 B1 | * | 1/2005 | Chang ................. | 206/232 |

* cited by examiner

*Primary Examiner*—Jila Mohandesi
*Assistant Examiner*—Steven Pollicoff
(74) *Attorney, Agent, or Firm*—Ostrolenk, Faber, Gerb & Soffen, LLP

(57) ABSTRACT

A pouch for holding cards, flat sheets, photos, pictures and also a disc such as a CD or DVD: the pouch having lateral seams defining lateral sides, a bottom seam defining the bottom side of the pouch, and a downward recess in the bottom seam for nesting of a disc in the recess. A top flap above the upper open end of the pouch. Laterally inwardly extending upper and lower sets of seams holding the flap to the backing strip. The upper seams are of a longer length inward in the lateral direction. The upper and lower seams define a nest area at the top region of a disc and cooperate with recess at the bottom to hold the disc against lateral shifting. Single and plural arrays of the pouches on the backing are possible.

10 Claims, 3 Drawing Sheets

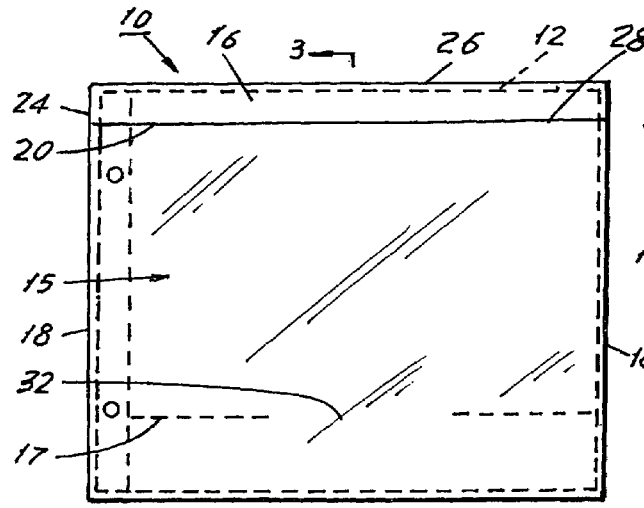
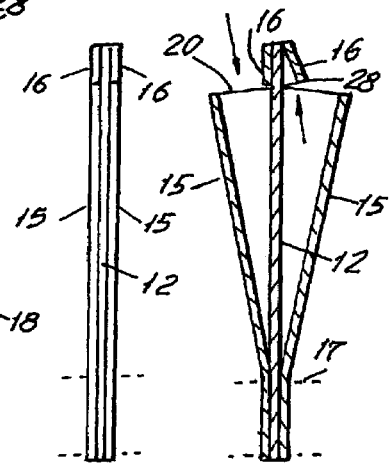
FIG. 1 PRIOR ART  FIG. 2  FIG. 3
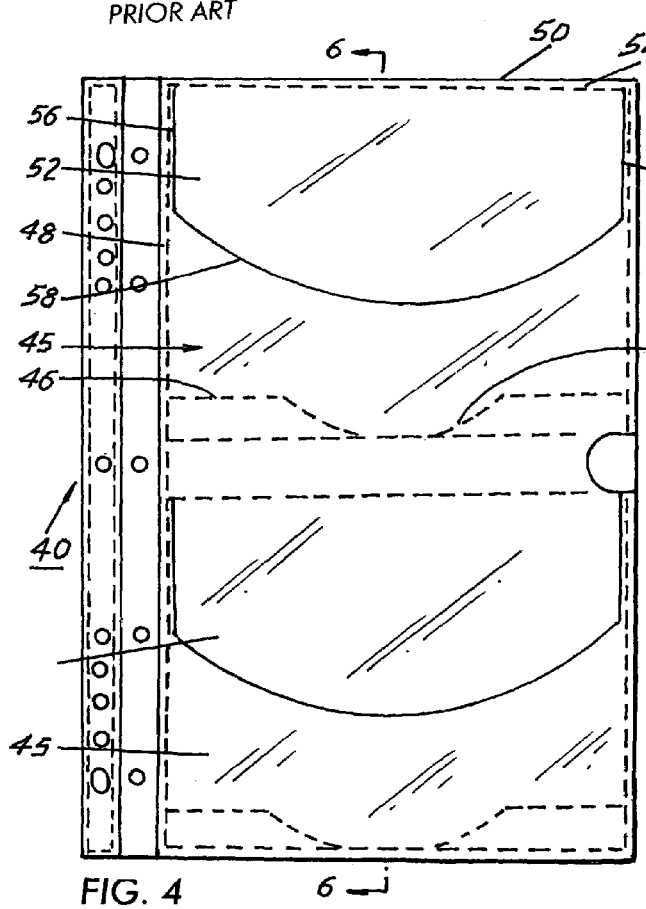
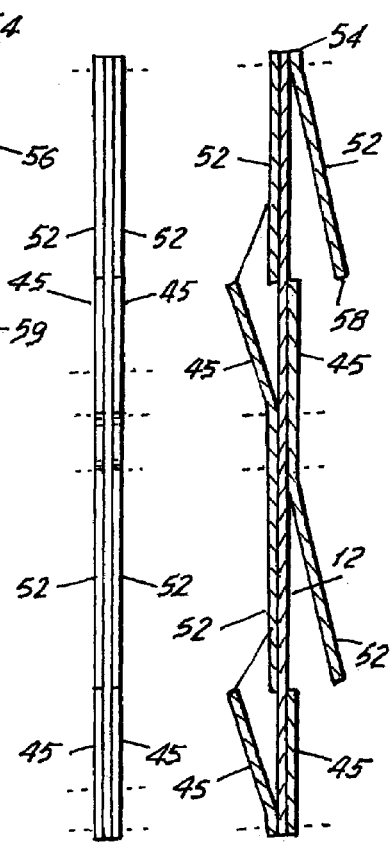
FIG. 4 PRIOR ART  FIG. 5  FIG. 6

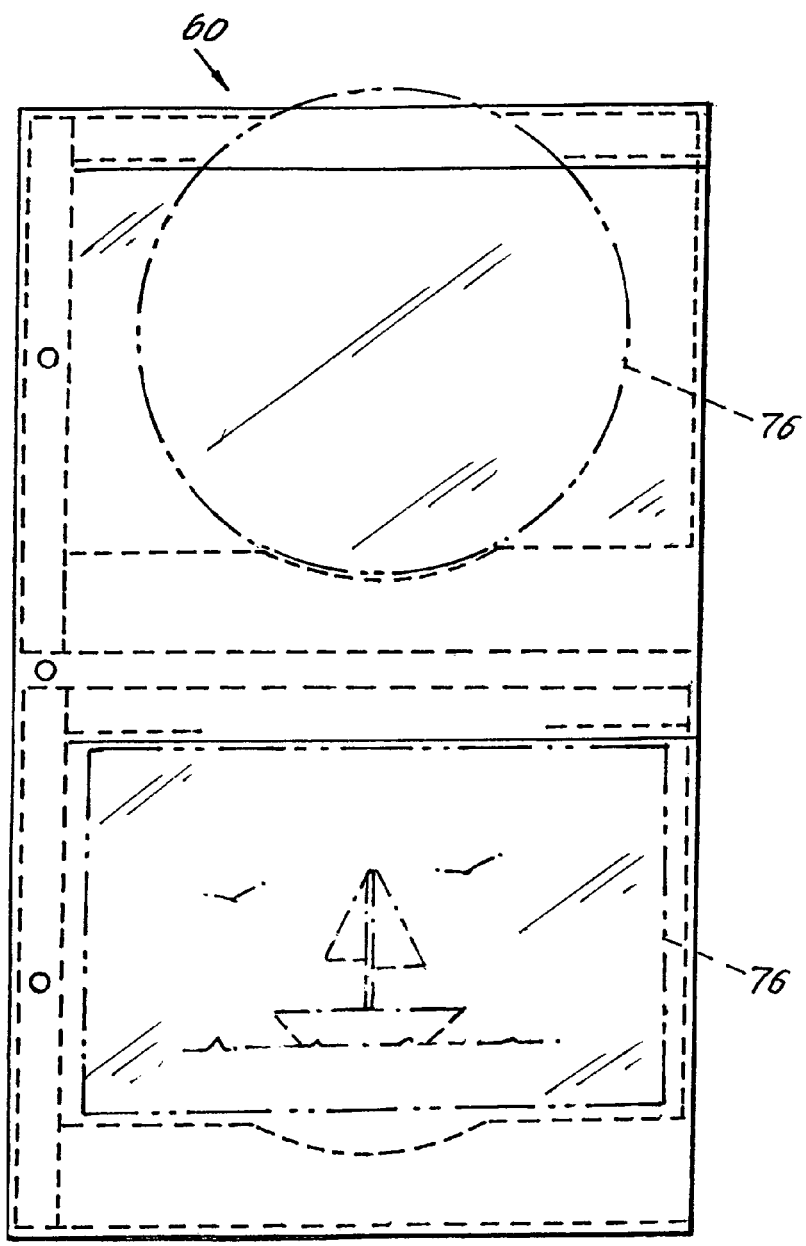
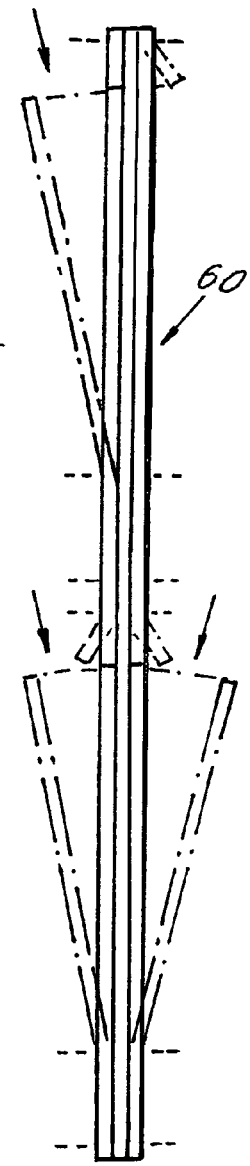
FIG. 11
FIG. 12

COMPACT DISC/PHOTO HOLDER

BACKGROUND OF THE INVENTION

The present invention relates to a holder adapted to hold a photo, picture or other flat object, on the one hand, and a disc, namely a compact disc or CD and DVD, on the other hand. It particularly relates to a construction of such a holder to securely hold the photo, picture, object or disc without risk that it might fall out of the holder.

There are known flexible material holders for photographs, pictures, objects or CDs, which holders comprise pouches or pockets. Those flexible holders may be on backings, such as pages fastened in an album. Each page holds one holder or a plurality of holders arranged above one another, side-by-side or in other configurations. A known holder on a page is a simple rectangular pouch with four sides, which is secured to the page on three of its sides. On the fourth side, the pouch is open to receive a photo, picture, object or disc. There may be no means, such as a fixture or cover, etc., that could prevent an object in the pouch from falling out. Furthermore, unless the open side of the pouch is shaped to provide access into the pouch, removal of the photo, picture, object or disc from the pouch may be difficult and may require deforming the page to enable the removal. The open side of the pouch may be profiled, e.g. with a depression, to provide access to the object to be removed. But that increases the chance that the object may fall out of the pouch.

It is conventional for the pouch to be comprised of transparent plastic material so that when the photo, picture, object or disc is in the pouch, it can be clearly seen through the front side of the pouch.

If the object in the pouch is a disc, such as a CD or DVD, there should be some means to support the disc so that it does not shift in the pouch or fall out of the pouch and so that if the pouch or the page on which the pouch is disposed is shaken or moved about, a disc will not shake free and will not be displaced in the pouch. Further, there should be easier access for removal of the disc from the pouch.

In one known pouch, an outer sheet is attached to a backing sheet along three sides of the pouch, with an arc-shaped cut across the face of the pouch for enabling insertion of a disc into the pouch and enabling access to the disc. However, that cut in the pouch would extend across a picture or a photo in the pouch.

An alternate known pouch has an outer sheet that is shorter than the normal expected height of the photo, picture or disc in the pouch, giving access to the picture, photo or disc at the open side of the pouch. A flap is also attached to the backing sheet at that height above the bottom of the pouch to which a picture or photo would normally extend or to which the top of the disc would extend. That flap is so secured to the backing sheet that the upper edge of the photo, picture or disc may be positioned under the flap to prevent the photo, picture or disc from falling out of or being easily removed from the pouch, until the flap is lifted giving access to the top of the object therein. However, this flap does not prevent the disc from shifting and does not fully support the disc against shifting.

It is known to provide a small arcuate recess in the bottom side of the pouch having the radius of a disc to be held in the pouch, and the edge of the disc is received in the recess. But nothing holds the top edge of the disc and it may fall out of the recess or shift around undesirably.

SUMMARY OF THE INVENTION

It is an object of the present invention to provide a pouch, or a page including a pouch or an album page with a pouch which is adapted to easily receive, to hold and to permit easy removal of a photo, picture, object or disc, such as a CD or DVD.

Another object of the invention is to hold a picture or photo in the pouch.

Another object is to support a disc in the pouch in a manner which does not allow it to shift in the pouch.

According to the invention, there is a base, substrate, page or backing sheet (any one is hereafter a backing) on which an object holding pouch is disposed. That backing is flat and strong enough to support the pouch but need not have any other characteristics in the invention.

A pouch is secured to the backing. It includes an outer side secured to the backing. Typically, the pouch is rectangular, with a closed bottom side, an opposite open top side into which an object is inserted and through which the object is removed, and closed lateral sides. The lateral sides are spaced apart sufficiently for a typical photo or picture or CD or DVD or disc which the pouch is intended to receive and hold. The bottom side and two lateral sides of the outer side of the pouch are secured to the backing along their entire length, e.g., by heat sealing or stitching or another manner of seaming them together, thereby defining the pouch.

The outer side of the pouch is transparent to enable viewing of the picture, photo or disc in the pouch. It is preferred that the material of the pouch be a clear plastic adapted to be heat sealed to the backing. But, the invention is not limited to any specific material for the pouch or the backing.

The bottom side of the pouch has an arcuate shaped recess of a radius of a disc intended to be supported in the pouch and which positions an installed disc. The lateral sides of the pouch extend up toward the top of the pouch.

The improvement is formed at the top side of the pouch. Both of the lateral sides extend up to a short distance from the top side of the pouch. Above the top edges of the lateral sides of the pouch and the top side of the pouch, there is a flap. The flap is attached to the backing in a manner which can hold the top edge of a photo or picture and securely hold and position a disc in the pouch. The flap is short in height and extends across the width of the pouch between the lateral sides.

Both the bottom edge of the flap which is toward the pouch and the top edge of the flap away from the pouch are secured or seamed to the backing only part way across the pouch. The bottom edge of the flap is seamed to the backing a relatively shorter first distance inward laterally from each lateral side and toward the other lateral side, leaving a first wider unseamed central region between the two seams at the bottom of the flap. The top edge of the flap is similarly seamed to the backing a relatively longer second distance inward laterally from each lateral side and toward the other lateral side and leaving a second narrower unseamed central region. The second distance inward of the seams at the upper side of the flap is greater than the first distance inward of the seams at the lower side of the flap. The second unseamed central region between the two seams at the top of the flap is of a narrower width than the first unseamed region between the seams at the lower side of the flap. The first and second unseamed central regions at the bottom and top of the flap are centered over the recess in the bottom of the pouch and the central regions are of a width related to the radius of a disc held there so that the edge of the disc may be nested securely to pass through the central region at the bottom of the top flap and to pass into the central region at the top side of the flap. A disc in the pouch is held in the recess at the bottom of the pouch and in the unseamed central regions of the flap.

Other features and advantages of the present invention will become apparent from the following description of the invention which refers to the accompanying drawings.

BRIEF DESCRIPTION OF THE DRAWINGS

FIGS. 1, 2 and 3 are respectively front, side and side sectional views of a first prior art embodiment of a holder for a picture or photo or a disc such as a CD;

FIGS. 4–6 are respectively front, side and side sectional views of a second prior art embodiment thereof;

FIGS. 11 and 12 are front and side views of an alternate embodiment.

DESCRIPTION OF PRIOR ART EMBODIMENTS

Figure 7:
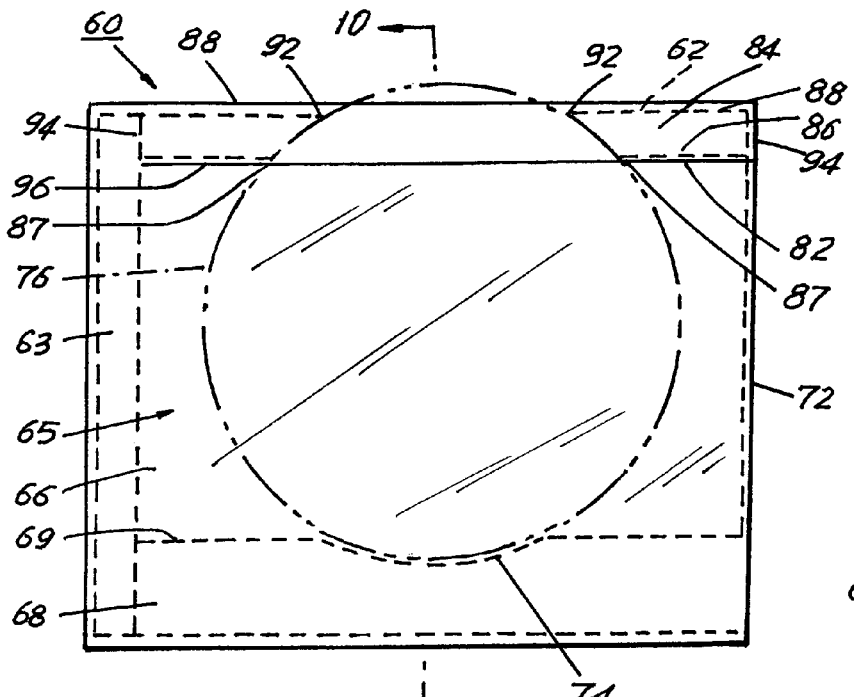
FIGS. 7–9 are respectively front, side and side sectional views of an embodiment of the invention.

FIGS. 1–3 illustrate a first prior art embodiment of a holder 10 for a picture, photo, object or disc. The holder includes a rectangular pouch 15. The holder includes a backing sheet 12 and the pouch 15 is secured to the backing 12 by being seamed, e.g. heat sealed, at the bottom side 17 and the lateral sides 18.

The backing 12 may be paper or plastic and may be opaque, translucent or transparent. Its significant characteristics are that it is of flexible material so it might be deformed as needed and it is capable of having a pouch for holding photos, pictures and CDs seamed to it and stiff enough to support a filled pouch. The backing 12 is comprised of a material which either is capable of being heat sealed or is coated with such material.

There may be a pouch 15 on only one side of the backing 12, or on opposite sides, as shown in FIGS. 2 and 3. The pouch 15 to be attached to the backing sheet 12 is or has an outer side that is comprised of a transparent heat sealable plastic material so that the pouch may be heat sealed to the backing. However, other modes of attachment or adhesion of the pouch to the backing may be used as well.

There is a flap 16 above the top side 20 of the pouch 15. The lateral sides 24 of the flap 16 and the top edge 26 of the flap are seamed to the backing 12. The bottom edge 28 of the flap 16 is unattached to the backing 12 so that the bottom edge 28 of the flap 16 can be lifted. The flap 16 helps hold the top end of a disc or the top edge of a picture or a photograph or another object to hold them in the pouch 15. The straight, laterally directed seam 17 across the bottom side of the pouch is not continuous. Instead, it has a central unseamed region 32 which can hold the bottom edge region of a disc in the pouch to try to hold the disc stationary.

FIGS. 4–6 illustrate a second prior art holder embodiment 40 for a picture, photo, object or disc. In this and other prior art and inventive embodiments one or two or more of the holders with pouches may be provided on a single backing, the pouches being arrayed one above the other as illustrated, or next to each other, or in other arrays.

Each pouch 45 has a bottom side 46, opposite lateral sides 48 and a top side 50 at which a large top flap 52 may be provided. The edges 46 and 48 of the pouch are firmly seamed along the sides to the backing sheet 12. The top side 50 of the pouch is closed. The large flap 52 is defined by being attached along the top edge 54 thereof at the top of the flap. The flap 52 is unattached at the lateral sides 56 of the flap and the bottom edge 58 of the flap is unattached. A picture, photo or a disc may be supported in the pouch by raising the bottom edge 58 of the flap so that the upper region of the picture, photo or disc may be received under the flap. However, there is nothing at the flap at the top of the pouch that prevents the shifting of a disc laterally, no secure nest for the disc in this pouch.

The bottom side 46 of the pouch has a recess 59 curved on the radius of a disc to be held, which receives the bottom edge of a disc in the pouch and helps position the disc. But, this is not a secure nest and the disc can still shift in the pouch.

To enable insertion and removal of a photo or disc, the pouch 45 includes a slit opening at the bottom edge 58 of the flap. That edge has a preferably round shape and extends across about the center height of the pouch 45. This enables easy insertion and removal of a disc and the upper part of the disc above the slit at 58 is easily accessible enabling removal of the disc. However, a disc is not thereby securely held. Perhaps the disc upper side might be placed under the flap 52. Further, the slit at 58 extends across the entire pouch and across any photo or picture therein, marring the view of the picture or photo.

DESCRIPTION OF PREFERRED EMBODIMENTS

Figure 8:
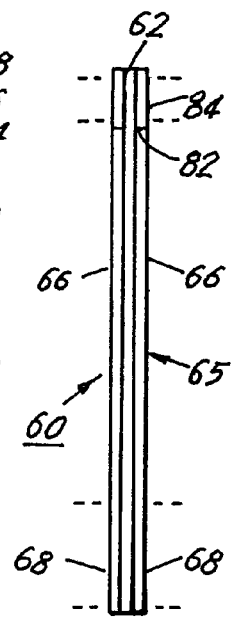
Figure 9:
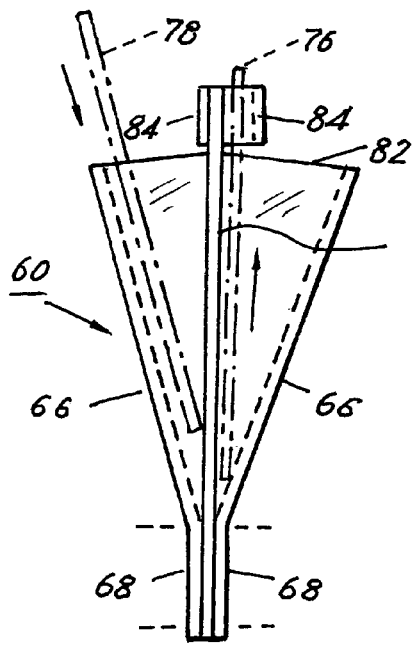
Figure 10:
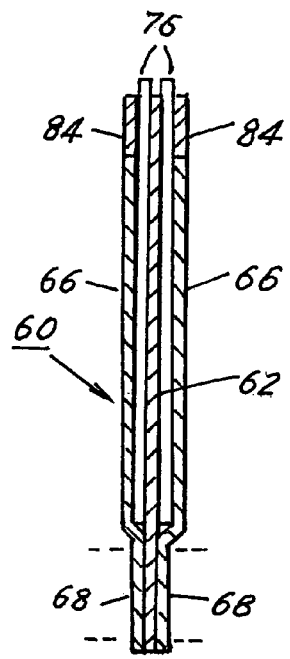
FIG. 10 is a side sectional view of the holder with objects in the pouches.

An embodiment of a holder of the invention in FIGS. 7–10 shows a picture, photo, object and disc holder 60. It includes a backing 62 of paper or plastic, which is opaque or transparent and is preferably flexible, possibly useful as a page of an album. The materials of the backing 62 and the pouch 65 on it are selected so that the pouch is flattened on the backing sheet 62 when empty, may be deformed to open to receive an object in the pouch and self restores to a flattened condition after the object is installed in the pouch.

There may be a fastening element 63 along one margin of the backing sheet enabling it to be attached in an album.

A rectangular pouch 65 is attached to the backing 62. The pouch 65 is comprised of a transparent sheet outer side 66 of flexible, transparent plastic material of a type known in the album art. The sheet 66 is seamed to the backing 62 along three of its four peripheral sides including a bottom margin 68 at the bottom 69 of the pouch and at the lateral sides 72 which meet the bottom margin 68.

The external pouch material may be attached to the backing sheet in any of several known manners, e.g., stitching or heat sealing or adhering. The generic term used for this attachment is a seam or seaming the two together, but that is to be understood as including any known mode of attachment.

The side seams which define the lateral sides 72 of the pouch 65 are spaced apart a distance selected as the normal size of a photograph to be installed there, so that the photograph would be held against shifting laterally within the pouch. A photograph or picture may be cut to size to be held securely within that pouch between the sides 72. The bottom side 69 of the pouch has a depression or recess 74 which has a radius of curvature that corresponds for example to the radius of a compact disc 76 that may be held within the pouch. But the recess 74 will not keep the disc 76 from shifting laterally since the disc is held on only one edge by the recess 74.

The invention is primarily concerned with the top end of the holder 60. The lateral sides 72 of the pouch extends up past the open upper end 82 of the pouch and defines there a flap 84 having characteristics defined by the manner in which the flap is seamed to the backing 62. The flap is held by two sets of laterally inwardly extending seams. The lower seams 86, which are inward down toward the pouch, extend laterally inward to an inner end 87 of each lower seam over a first distance which is selected so that the inner ends 87 both are at a chord across a disc in the pouch such that the periphery of the disc would generally be guided by the ends 87 of the lower seams 86 in cooperation with the recess 74 to hold the disc from shifting laterally in the pouch.

The top side of the flap 84 is defined by an upper set of seams 88, which are spaced above the lower set of seams 86. The two sets of seams 86 and 88 define the height of the flap 84. The seams 88 extend laterally inward toward each other to their respective inner ends 92 which are laterally more inward than the ends 87 of the seams 86. The locations of the ends 92 are near enough that they also generally are at and define another chord across a disc then in the pouch, and the ends 92 leave an open central region in which the then upper end of the disc may project. The cooperating ends 87 of the lower seams 86 and the ends 92 of the upper seams 88 together with the recess 74 define a nest for a disc 76 installed in the pouch 65 and prevent the disc from shifting.

The flap 84 is seamed above at 88, below at 86 and on the sides 94. The open area 96 between the inner ends 87 of the lower seams 86 has the pouch material 66 extending across it and the flap 84 closes over the open top 82 of the pouch. In order to install a photo or picture in the pouch 65, a user's finger may be pushed into the pouch open end 82 to pull it out sufficiently to enable a picture or a disc to be installed. The side margins of a picture (not shown) in the pouch will be beneath one or both of the lower seams 86 which will hold the picture in the pouch against falling out of the pouch. To place a disc in the pouch, the upper end 82 of the pouch is pulled forward and the disc is slipped in. To lock the disc in the pouch, the flap 84 is raised particularly at the free central region 96 of the flap between the inner ends 87 of the lower seam 86 and the flap is then lifted over the then top edge of the disc and is rested on the top edge region of the disc which secures the disc under the flap 84 and between the seam ends 87 and 92 which also holds the disc in the recess 74 and nests it against shifting.

The disc cannot fall out from under the flap 84. To remove a disc, the installation step is reversed, i.e., the flap 84 is raised by a user placing his finger in the opening 82, the disc is drawn forward of the flap and then it can be removed from the pouch. Similarly, a photograph would be removed from the pouch by pulling the open end 82 forward and bending the pouch and/or the photo or picture to remove it from the pouch.

FIGS. 7–10 show the arrangement with a single pouch. Alternate configurations are available with a plurality of pouches arranged side-by-side or one under the other as in FIGS. 11 and 12 or any plurality of pouches may be on a backing. Each of the pouches in a plural array would have the same characteristics as the one pouch discussed above.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A pouch for holding and displaying an object, the pouch comprising:
   a backing defining a first side of the pouch;
   a pouch layer defining an opposite outer side of the pouch the pouch layer being comprised of a material enabling viewing into the pouch;
   the outer side of the pouch being seamed to the backing at a plurality of seams defining the pouch, the seams including opposite lateral side seams at and defining lateral sides of the pouch, and a bottom seam defining a bottom side of the pouch;
   the pouch having a top side that is open to provide access for the object into the pouch;
   a flap comprising a strip of material above the open side of the pouch, the flap being defined by
   a respective lower seam extending laterally inward, from each of the lateral side seams toward the other lateral side seam, inward a first shorter distance ending at spaced apart, first inward ends of the lower seams and defining a lower central region between the first ends;
   a respective upper seam spaced above the lower seam and extending laterally inward, from each of the lateral side seams toward the other lateral side seam, inward a second longer distance ending at spaced apart second inward ends of the upper seams that are further laterally inward than the first inward ends, the second ends defining an upper central region between the second ends, each of the first and second inward ends of the lower and upper seams being positioned at a respective chord of a disc that may be positioned in the pouch for helping define a nest for receiving a then upper region of the disc and for preventing lateral movement of the disc in the pouch when the disc is placed in the pouch with a then lower region of the disc toward the bottom seam of the pouch and when the flap is positioned over the then upper region of the disc.

2. The holder of claim 1, wherein the bottom seam of the pouch is shaped to define a recess downward, the recess being shaped generally to aid in defining the nest for a disc placed in the pouch including at the bottom seam of the pouch.

3. The holder of claim 2, wherein the recess in the bottom seam is below the central regions between the inward ends of the seams for defining the nest for a disc.

4. The holder of claim 3, wherein the recess at the bottom seam of the pouch is arcuate in shape with a radius generally corresponding to that of a disc placed in the pouch.

5. The holder of claim 2, wherein the recess at the bottom seam of the pouch is arcuate in shape with a radius generally corresponding to that of a disc placed in the pouch.

6. The holder of claim 1, wherein the lateral side seams extend in height from the bottom seam of the pouch past the lower seams of the flap to the upper seams of the flap, whereby the lateral seams define the lateral sides of the flap and of the pouch.

7. The holder of claim 1, wherein the pouch layer is transparent.

8. The holder of claim 7, wherein there is no slit in the pouch layer side between the lateral seams and between the bottom seam and the top of the pouch below the lower seams of the flap.

9. The holder of claim 2, wherein there are a plurality of the pouches secured near one another on the backing.

10. The holder of claim 1, wherein the pouch and the backing are of material that is sufficiently flexible as to allow the pouch to be opened to enable insertion of an object therein, and stiff enough to attempt to restore to a flattened condition.

* * * * *

UNITED STATES PATENT AND TRADEMARK OFFICE
CERTIFICATE OF CORRECTION

PATENT NO. : 7,100,766 B2  Page 1 of 1
APPLICATION NO. : 10/791234
DATED : September 5, 2006
INVENTOR(S) : John Ng Wa Fai It is certified that error appears in the above-identified patent and that said Letters Patent is hereby corrected as shown below:

On Title Page, Item (73) Assignee should read:

Northvale Industrial Co., Ltd. (CA)

Signed and Sealed this

Fifth Day of December, 2006

JON W. DUDAS
*Director of the United States Patent and Trademark Office*